United States Patent [19]

Fukui et al.

[11] Patent Number: 5,100,766
[45] Date of Patent: Mar. 31, 1992

[54] OPTICAL RECORDING MEDIUM

[75] Inventors: Tetsuro Fukui; Takeshi Miyazaki, both of Kawasaki, Japan

[73] Assignee: Canon Kabushiki Kaisha, Tokyo, Japan

[21] Appl. No.: 711,720

[22] Filed: Jun. 7, 1991

Related U.S. Application Data

[63] Continuation of Ser. No. 506,555, Apr. 5, 1990, abandoned, which is a continuation of Ser. No. 168,967, Mar. 16, 1988, abandoned.

[30] Foreign Application Priority Data

Mar. 18, 1987 [JP]  Japan ................................ 62-61327

[51] Int. Cl.⁵ ............................................. G11B 7/24
[52] U.S. Cl. ..................................... 430/270; 430/272; 430/495; 430/945; 346/135.1
[58] Field of Search ............... 430/270, 272, 495, 945; 346/766, 135.1

[56] References Cited

U.S. PATENT DOCUMENTS

| | | | |
|---|---|---|---|
| 4,270,132 | 5/1981 | Bell | 346/135.1 |
| 4,394,661 | 7/1983 | Peeters | 430/945 |
| 4,622,261 | 11/1986 | Ochiai | 346/76 L |
| 4,622,284 | 11/1986 | West et al. | 430/495 |
| 4,626,496 | 12/1986 | Sato | 430/270 |
| 4,656,121 | 4/1987 | Sato et al. | 430/495 |
| 4,714,667 | 12/1987 | Sato et al. | 430/270 |
| 4,759,991 | 7/1988 | Kanno | 428/447 |

Primary Examiner—Charles L. Bowers, Jr.
Assistant Examiner—Kathleen Duda
Attorney, Agent, or Firm—Fitzpatrick, Cella, Harper & Scinto

[57] ABSTRACT

An optical recording medium comprising a substrate having thereon a subbing layer and a recording layer, wherein said subbing layer comprises two layers comprising a layer having a relatively high thermal conductivity and a layer having a relatively low thermal conductivity.

30 Claims, 1 Drawing Sheet

OPTICAL RECORDING MEDIUM

This application is a continuation of application Ser. No. 506,555 filed Apr. 5, 1990, which is a continuation of application Ser. No. 168,967, filed Mar. 16, 1988, now abandoned.

BACKGROUND OF THE INVENTION

1. Field of the Invention

The present invention relates to an optical information recording medium suited for optical writing recording by use of a laser beam or the like, and, more particularly, to an improved optical recording medium that can be used in optical discs, optical cards, etc.

2. Related Background Art

In general, optical recording mediums as exemplified by optical discs and optical cards can record information in a high density by forming optically detectable pits of minute size, for example, of about 1 μm on a thin recording layer provided on a substrate having grooves of spiral, circular or linear form.

The recording layer, i.e., a laser-beam-sensitive layer can absorb laser beam energy to form optically detectable pits thereon. For example, in a certain heat mode recording system, the laser-beam-sensitive layer absorbs a heat energy to form minute concaves (i.e., pits) on that energy-absorbed parts by evaporation or fusion. In another heat mode system, the absorption of the energy of the irradiated laser beam can form pits having an optically detectable density difference on that parts.

The information recorded on the optical discs or optical cards can be detected by reading optical changes between the part on which the pits are formed and the part on which the pits are not formed. For example, in the instance of the optical discs or optical cards, a laser beam is scanned along a track, and the energy reflected by a disc or card is monitored by a photodetector. At the part on which the pits are formed, the reflection of the laser beam is lowered and the output from the photodetector becomes smaller. On the other hand, at the part on which the pits are not formed, the laser beam is sufficiently reflected and the output form the photodetector becomes larger.

Hitherto proposed as the recording layers used in such optical recording mediums are those in which inorganic materials are chiefly used, for example, metallic thin films such as aluminum- or gold-deposited films, bismuth thin films, tellurium oxide thin films, chalcogenite type amorphous glass films or the like. These thin films, however, have been disadvantageous such that they involve poor storage stability, low resolution power, low recording density, high production cost, etc.

Recently, also proposed is to use in the recording layer an organic coloring matter thin film whose physical properties can be changed by light of a relatively long wavelength. This organic coloring matter thin film can eliminate the above disadvantages, but, in general, organic coloring matters having absorption characteristics on the side of the long wavelength has the problem such that they have a low stability to heat and light. Taking account of these points, the organic coloring matters used in recording materials are required to have the following properties. Namely;

1. They have no toxicity;
2. They have absorption in the vicinity of 800 nm, and have a large absorptivity coefficient;
3. They have a good solubility to organic solvents;
4. They have a large reflectance in the vicinity 20 of 800 nm in a thin film state;
5. They can be crystallized with difficulty in a thin film state;
6. They have stability to ultraviolet light and visible light;
7. They have thermal stability;
8. They have stability to moisture;
9. They can be readily synthesized; etc.

Various types of organic coloring matters have recently been proposed as the coloring matters that can satisfy these performances. However, these organic dyes, although they are compounds that can be utilized in optical recording mediums, have the problem that the CN value may be lowered by repeated irradiation of reproducing light, which is a disadvantage generally inherent in the organic recording materials. This is presumably because heat is accumulated in the recording layer as heat energy when even a laser beam of low energy like the reproducing light is repeatedly irradiated, and the recording layer is fused or decomposed by that heat.

On the other hand, it has been reported in various ways to provide a subbing layer in the optical recording medium for the purposes of improving the adhesion between a substrate and a recording layer, improving solvent-resistant effect and reflectance to the substrate, and improving storage stability of the recording layer. Known materials for the subbing layer include polymeric materials such as polyamide type resins, vinyl type resins, natural polymers and silicone resins, or silane coupling agents, inorganic compounds such as $MgF_2$, $SiO$, $TiO_2$, $ZnO$, $TiN$ and $SiN$, and metals such as Zn, Cu, S, Ni, Cr and Se.

The subbing layer made of these materials, however, aims at improving the adhesion and solvent resistance mentioned above, and there have been known not so many subbing layers that are effectual for obtaining a high CN value (or SN value), except that, for example, Japanese Laid Open Patent Application No. 11292/1986 discloses, as a subbing layer that can improve the CN value, a subbing layer comprising a coating of a colloid particle dispersion with a silicon type condensate. The optimum film thickness range of this subbing layer, however, is very narrow as little as from 80 Å to 120 Å, and the CN value may greatly vary depending on the irregularity in the film thickness, resulting in difficulty in controlling the film thickness when preparing the recording medium.

On the other hand, the recording layer is known to have better pit shapes when the recording is performed, if it is in a flat state as nearly as possible. When the recording is performed on a recording layer on which the shape of truck grooves is reflected, the rims of the pits formed are liable to lose their shapes to worsen the pit shapes, therefore leading to worsened CN values.

Accordingly, the subbing layer may preferably be formed on the substrate with a little larger thickness in the manner that the recording layer to be laminated thereon may become close to a flat state. However, in the case of the above-mentioned subbing layer, an increase in the film thickness may result in the worsening of CN values. This is presumably because the subbing layer comprising the silicon type condensate has so a high thermal conductivity that it may follow, with increase in the film thickness, that the heat energy generated when the power of a recording laser beam is converted from light to heat in the recording layer is not effectively used for the formation of the pits. Moreover, if the film thickness is made to be from 500 Å to 1,000 Å or more, it follows that the track grooves provided on the substrate, which are usually formed thereon with a depth of 500 Å to 1,000 Å, are buried and no tracking signal is obtained, resulting in reproduction incapability.

SUMMARY OF THE INVENTION

The present invention has solved the above problems, and the object thereof is to provide an optical recording medium that can prevent the writing to a recording layer by reproducing light, and also can obtain a high CN value.

Namely, the optical recording medium according to the present invention comprises a substrate having thereon a subbing layer and a recording layer, wherein said subbing layer comprises two layers comprising a layer having a relatively high thermal conductivity and a layer having a relatively low thermal conductivity.

More specifically, a layer comprising a compound having a siloxane bond and subjected to acrylic modification, i.e., AS-layer, can be formed with a larger thickness without any lowering of the CN value by virtue of its low thermal conductivity. Accordingly, the film thickness of the subbing layer can be made larger, and also the recording layer can be made close to a flat state. Moreover, the AS-layer is so soft that it may not hinder the formation of the pits to be formed by change in shape of the recording layer. Therefore, according to the present invention, wherein the subbing layer is made to have the two layer structure comprised of the above AS-layer and a layer having good thermal conductivity and comprising a compound having a siloxane bond, i.e., S-layer, it is possible to obtain an optical recording medium having a high CN value and also having prevented the writing to the recording layer by reproducing light.

DETAILED DESCRIPTION OF PREFERRED EMBODIMENTS

Figure 1:
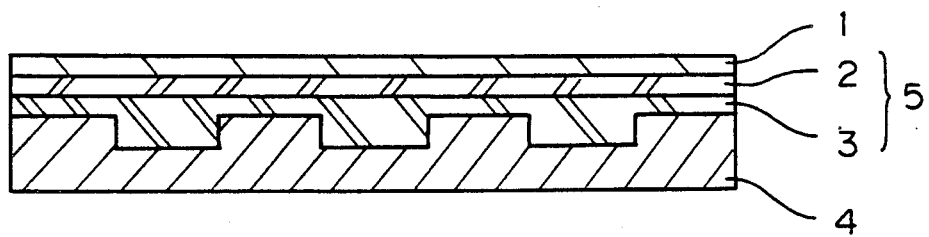
FIG. 1 is a cross sectional view illustrating an embodiment of the present invention.

FIG. 1 is a cross sectional view illustrating an embodiment of the present invention. In FIG. 1, the numeral 1 denotes a recording layer; 2, a layer comprising a compound having a siloxane bond (hereinafter abridged as "S-layer"); 3, a layer comprising a compound having a siloxane bond and subjected to acrylic modification (hereinafter abridged as "AS-layer"; and 4, a substrate having track grooves.

The optical recording medium of the present invention is characterized by being provided with a subbing layer comprising two layers of the AS-layer and S-layer. This subbing layer may be provided in the order such that the AS-layer is formed on the substrate having track grooves and thereafter the S-layer is formed thereon, or, in reverse, the AS-layer may be provided after the S-layer has been formed, but preferred is the former constitution in view of the advantage that the film thickness control of the AS-layer provided on the track grooves is not required to be made not so precisely and the layer can be made to have a thickness larger than such a degree that the track grooves are buried.

In the present invention, the compound having a siloxane bond and used for forming the S-layer can be obtained by hydrolization of alkoxy silanes. The alkoxysilane which may be used includes ortho-methyl silicate, orthoethyl silicate, ortho-n-propyl silicate, ortho n-butyl silicate, ortho-2-methoxyethyl silicate, and polymers of these. Other materials for the subbing layers having good thermal conductivity include $Al_2O_3$, $TiO_2$, $SnO_2$, Al, Cu, Pt, Au, Te, etc. These can be formed by vapor deposition or sputtering, or besides can be formed by spinner coating with use of an alcoholate as exemplified by ethyl orthotitanate, aluminum alcoholate, etc.

An optimum film thickness of the S-layer varies depending on the constitution of the subbing layer according to the present invention. More specifically, in the instance where the S-layer is provided on the track grooves of the substrate, preferred is a film thickness of the degree such that the track grooves may not be buried, the CN value may not be worsened, and the heat dissipation properties may not be lowered, desirably of from 50 Å to 900 Å, particularly from 200 Å to 600 Å.

In the instance where the S-layer is formed on the AS-layer, there is no particular limitation in it, but preferred is a film thickness of the degree such that the CN value may not be worsened and also the heat dissipation properties may not be lowered. In this instance, an optimum film thickness of the S-layer ranges from 150 Å to 2,000 Å, more preferably from 200 Å to 700 Å.

In the present invention, polysiloxane substituted with an acrylic resin is used for forming the AS-layer, and there can be utilized a condensate of silyl-group containing poly(butyl methacrylate) resins and polysiloxane. The silyl-group containing poly(butyl methacrylate) resin is obtained by adding methyl dimethoxy silane to the double bond of poly(butyl methacrylate) resin and the like, as described, for example, in Japanese Laid Open Patent Application No. 84366/1985. The acrylic resin includes acrylic resins and methacrylic resins, and may be a copolymer containing a component copolymerizable with them. An optimum film thickness of the AS-layer ranges from 150 Å to 1.0 μ, more preferably from 200 Å to 2,000 Å.

In the present invention, the AS-layer is presumed to comprise resin components arranged on the substrate face in the manner as shown below and adhered in a multi-layer form.

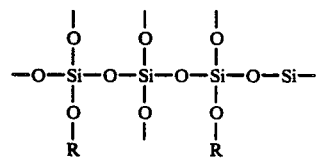

R represents a resin component.

The AS-layer may preferably be provided by coating.

The optical recording medium of the present invention is constituted of the substrate having track grooves, the above subbing layer formed thereon, and the recording layer containing an organic coloring matter, provided on the subbing layer. Then, a laser beam is irradiated on this recording layer to cause changes in shape of the recording layer, whereby the information is recorded.

The organic coloring matter may include the following compounds: Polymethine type coloring matter represented by Formula (I):

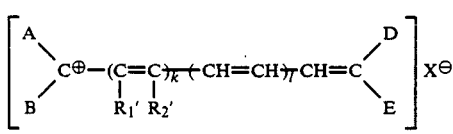   (I)

wherein, A, B, D and E each represent a hydrogen atom, an alkyl group, an alkenyl group, a substituted or unsubstituted aralkyl group, a substituted or unsubstituted aryl group, a styryl group, a substituted styryl group, a heterocyclic group, or a substituted heterocyclic group; $r_1'$ and $r_2'$ each represent a hydrogen atom, an alkyl group, a cyclic alkyl group, an alkenyl group, an aralkyl group, a substituted aralkyl group or an aryl group; k represents 0 or 1; l, an integer of 0, 1 or 2; and $X^{\ominus}$, an anion.

Coloring matter represented by Formula (II):

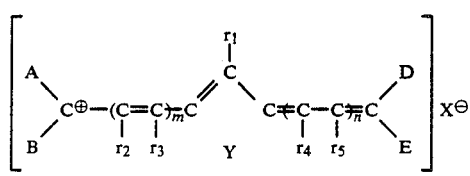   (II)

wherein A, B, D, E and $X^{\ominus}$ each are as defined above; $r_1$, $r_2$, $r_3$, $r_4$ and $r_5$ each represent a hydrogen atom, a halogen atom, an alkyl group or an aryl group; Y represents a divalent residual group having a group of atoms necessary for completing a ring of 5 or 6 members; m and n each represent an integer of 0, 1 or 2.

Coloring matter represented by Formula (III):

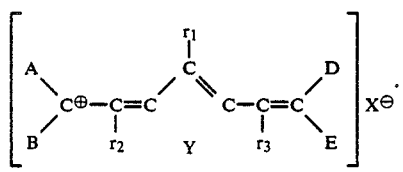   (III)

wherein A, B, D, E, $r_1$, $r_2$, $r_3$, Y and $X^{\ominus}$ are as defined above.

Coloring matter represented by Formula (IV):

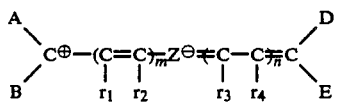   (IV)

wherein A, B, D, E, $r_1$, $r_2$, $r_3$, $r_4$, m and n are as defined above, and $Z^{\ominus}$ represents

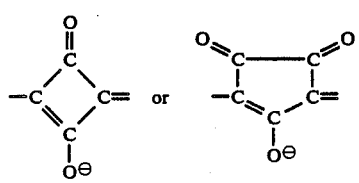

Azulenium coloring matter represented by Formula (V), (VI) or (VII):

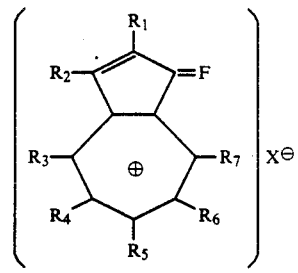   (V)

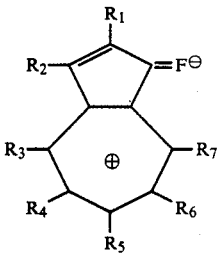   (VI)

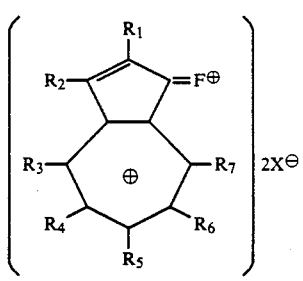   (VII)

In the formula, $R_1$, $R_2$, $R_3$, $R_4$, $R_5$, $R_6$ and $R_7$ each represent a hydrogen atom, a halogen atom (including a chlorine atom, a bromine atom and an iodine atom) or a monovalent organic residual group. The monovalent organic group can be selected from the groups covering a wide range, including, for example, an alkyl group, an aryl group, a substituted or unsubstituted aralkyl group, a substituted or unsubstituted amino group, a substituted or unsubstituted styryl group, a nitro group, a hydroxyl group, a carboxyl group, a cyano group or an arylazo group, etc. A substituted or unsubstituted condensed ring may also be formed by at least one of the combinations of $R_1$ with $R_2$, $R_2$ with $R_3$, $R_3$ with $R_4$, $R_4$ with $R_5$, $R_5$ with $R_6$ and $R_6$ with $R_7$. The condensed ring includes condensed rings of 5, 6 or 7 members, including aromatic rings (such as benzene, naphthalene, chlorobenzene, bromobenzene, methyl benzene, ethylbenzene, methoxybenzene and ethoxybenzene), heterocyclic rings (such as a furan ring, a benzofuran ring, a pyrol ring, a thiophene ring, a pyridine ring, a quinoline ring and a thiazole ring) and aliphatic rings (such as dimethylene, trimethylene and tetramethylene). $X^{\ominus}$ is as defined above and represents an anion.

F represents a divalent organic residual group combined by a double bond. Specific examples in the present invention, containing such F, may include those represented respectively by Formulas (1) to (11) shown below. Provided that $Q^{\oplus}$ in the formula represents an azulenium salt nucleus shown below, and the right side excluding $Q^{\oplus}$ in the formula indicates F.

Azulenium salt nucleus ($Q^{\oplus}$):

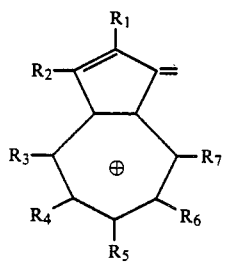

Formulas:

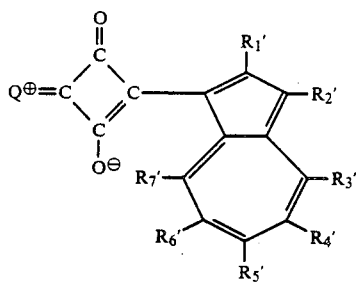
(1)

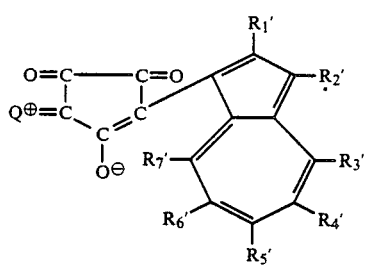
(2)

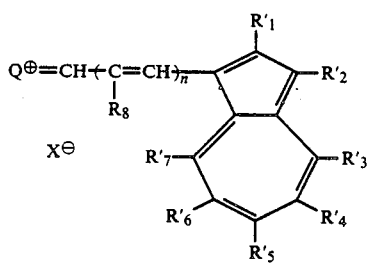
(3)

$R_1'$ to $R_7'$ are as defined for $R_1$ to $R_7$.

Also, the azulenium slat nucleus represented by $Q^\oplus$ and the azulene salt nucleus at the right side in the above Formula (3) may be symmetrical or unsymmetrical.

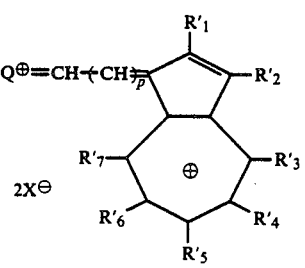
(4)

-continued

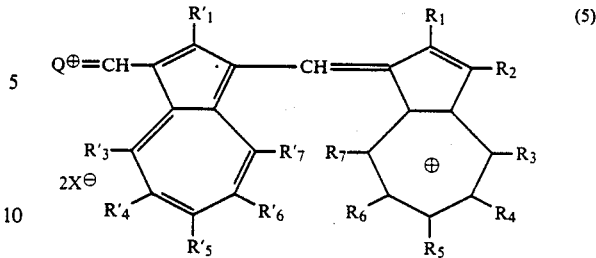
(5)

$$Q^\oplus=CH+CH\mathrel{\overline{\mathrel{\mkern-3mu}}_{p}}C+CH=CH\mathrel{\overline{\mathrel{\mkern-3mu}}_{k}}N-R_9 \quad\quad M \quad (6)$$
$$X^\ominus$$

$$Q^\oplus=CH-CH\mathrel{\overline{\mathrel{\mkern-3mu}}}CH\mathrel{\overline{\mathrel{\mkern-3mu}}_{p}}C\mathrel{\overline{\mathrel{\mkern-3mu}}}CH-CH\mathrel{\overline{\mathrel{\mkern-3mu}}_{k}}N-R_9 \quad M \quad (7)$$
$$2X^\ominus \quad\quad\quad\quad\quad\quad\quad\quad\quad\quad \oplus$$

In the formula, M represents a group of non-metallic atoms necessary for completing a nitrogen-containing heterocyclic ring.

$$Q^\oplus=(CH\mathrel{\overline{\mathrel{\mkern-3mu}}_{p}}R_{10} \quad (8)$$
$$qX^\ominus$$

In the formula, $R_{10}$ represents a substituted or unsubstituted aryl group or a cationic group thereof. p represents an integer of 1 to 8. q is 1 or 2.

$$Q^\oplus\mathrel{\overline{\mathrel{\mkern-3mu}}}CH\mathrel{\overline{\mathrel{\mkern-3mu}}_{p}}R_{11} \quad (9)$$
$$qX^\ominus$$

In the formula, $R_{11}$ represents a heterocyclic group or a cationic group thereof.

$$Q^\oplus=CH+CH\mathrel{\overline{\mathrel{\mkern-3mu}}_{p}}C-R_{10} \quad (10)$$
$$qX^\ominus \quad\quad R_{12}$$

In the formula, $R_{12}$ represents a hydrogen atom, an alkyl group or a substituted or unsubstituted aryl group.

$$Q^\oplus\mathrel{\overline{\mathrel{\mkern-3mu}}}CH\mathrel{\overline{\mathrel{\mkern-3mu}}_{p}}C\equiv C-R_{10} \quad (11)$$
$$X^\ominus$$

$$Q^\oplus-CH\mathrel{\overline{\mathrel{\mkern-3mu}}}CH\mathrel{\overline{\mathrel{\mkern-3mu}}_{p}}C+C=C\mathrel{\overline{\mathrel{\mkern-3mu}}_{k}}L \quad (12)$$
$$qX^\ominus \quad\quad R_{13}\,R_{14}$$

In the formula, $Z_2$ represents a group of atoms necessary for completing pyran, thiapyran, selenapyran, telluropyran, benzopyran, benzothiapyran, benzoselenapyran, benzotelluropyran, naphthopyran, naphthothiapyran, naphthoselenapyran or naphthotelluropyran that may be substituted. L represents a sulfur atom, an oxygen atom, a selenium atom or a tellurium atom. $R_{13}$ and $R_{14}$ each represent a hydrogen atom, an alkoxyl group, a substituted or unsubstituted aryl group, an alkenyl group or a heterocyclic group.

Preferred coloring matters include the coloring matters represented respectively by Formulas (VIII), (IX), (X) and (XI) shown below.

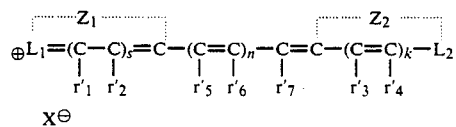

Formula (VIII)

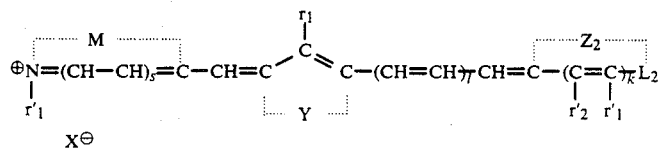

Formula (IX)

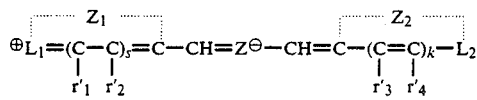

Formula (X)

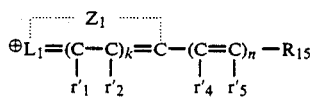

Formula (XI)

In the above Formulas (VIII), (IX), (X) and (XI), $L_1$ and $L_2$ each represent a sulfur atom, an oxygen atom, a selenium atom or a tellurium atom; $Z_1$ represents a group of atoms necessary for completing pyrylium, thiopyrylium, selenapyrylium, telluropyrylium, benzopyrylium, benzothiopyrylium, benzoselenapyrylium, benzotelluropyrylium, naphthopyrylium, naphthothiopyrylium, naphthoselenapyrylium or naphthotelluropyrylium that may be substituted; $Z_2$ represents a group of atoms necessary for completing pyran, thiopyran, selenapyran, telluropyran, benzopyran, benzothiopyran, benzoselenapyran, benzotelluropyran, naphthopyran, naphthothiopyran, naphthoselenapyran or naphthotelluropyran that may be substituted. Symbol s is an integer of 0 or 1. $R_{15}$ represents a substituted or unsubstituted aryl group or a substituted or unsubstituted heterocyclic group. M represents a group of non-metallic atoms sufficient for the formation of a nitrogen-containing heterocyclic ring. $r_3'$ to $r_7'$ are as defined for $r_1'$ and $r_2'$ described above. Symbols k, n, $r_1'$, $r_2'$, $r_1$, Y, $Z^{\ominus}$ and $X^{\ominus}$ are as defined above.

Symbols in the above formulas will be defined below in greater detail.

A, B, D and E each represent a hydrogen atom or an alkyl group (for example, a methyl group, an ethyl group, a n-propyl group, an iso-propyl group, a n-butyl group, a sec-butyl group, an iso-butyl group, a t-butyl group, a n-amyl group, a t-amyl group, a n-hexyl group, a n-octyl group, t-octyl group, etc.), including other alkyl groups as exemplified by substituted alkyl groups (for example, a 2-hydroxyethyl group, a 3-hydroxypropyl group, a 4-hydroxybutyl group, a 2-acetoxyethyl group, a carboxymethyl group, a 2-carboxyethyl group, a 3-carboxypropyl group, a 2-sulfoethyl group, a 3-sulfopropyl group, a 4-sulfobutyl group, a 3-sulfatopropyl group, a 4-sulfatobutyl group, a N-(methylsulfonyl)-carbamylmethyl group, a 3-(acetylsulfamyl)propyl group, a 4-(acetylsulfamyl)butyl group, etc.), cyclic alkyl groups (for example, a cyclohexyl group), an allyl group ($CH_2=CH-CH_2-$), alkenyl groups (for example, a vinyl group, a propenyl group, a butenyl group, a pentenyl group, a hexenyl group, a heptenyl group, an octenyl group, a dodecenyl group, a pulenyl group, etc.), aralkyl groups (for example, a benzyl group, a phenethyl group, an α-naphthylmethyl group, a β-naphthylmethyl group, etc.), substituted aralkyl groups (for example, a carboxybenzyl group, a sulfobenzyl group, a hydroxybenzyl group, etc.), etc. A, B, D and E each represent a substituted or unsubstituted aryl group (for example, a phenyl group, a naphthyl group, a tolyl group, a xylyl group, a methoxyphenyl group, a dimethoxyphenyl group, a trimethoxyphenyl group, an ethoxyphenyl group, a dimethylaminophenyl group, a diethylaminophenyl group, a dipropylaminophenyl group, a dibenzylaminophenyl group, a diphenylaminophenyl group, etc.), a substituted or unsubstituted heterocyclic group (for example, a pyridyl group, a quinolyl group, a lepidyl group, a methylpyridyl, a furyl group, a thienyl group, an indolyl group, a pyrrole group, a carbazolyl group, an N-ethylcarbazolyl group, etc.) or a substituted or unsubstituted styryl group (for example, a styryl group, a methoxystyryl group, a dimethoxystyryl group, a trimethoxystyryl group, an ethoxystyryl group, a dimethylaminostyryl group, a diethylaminostyryl group, a dipropylaminostyryl group, a dibenzylaminostyryl group, a diphenylaminostyryl group, a 2,2-diphenylvinyl group, a 2-phenyl-2-methylvinyl group, a 2-(dimethylaminophenyl)-2-phenylvinyl group, a 2-(diethylaminophenyl)-2-phenylvinyl group, a 2-(dibenzylaminophenyl)-2-phenylvinyl group, a 2,2-di(diethylaminophenyl)vinyl group, a 2,2-di(methoxyphenyl)vinyl group, a 2,2-di(ethoxyphenyl)vinyl group, a 2-(dimethylaminophenyl)-2-methylvinyl group, a 2-(diethylaminophenyl)-2-ethylvinyl group, etc.

Symbols $r_1'$, $r_2'$, $r_3'$, $r_4'$, $r_5'$, $r_6'$ and $r_7'$ each represent a hydrogen atom or an alkyl group (for example, a methyl group, an ethyl group, a n-propyl group, an iso-propyl group, a n-butyl group, a secbutyl group, an iso-butyl group, a t-butyl group, a n-amyl group, an iso-amyl group, a t-amyl group, a n-hexyl hexyl group, a n-octyl group, t-octyl group, a nonyl group, a dodecyl group etc.), including other alkyl groups, for example, substituted alkyl groups (for example, a 2-hydroxyethyl group, a 3-hydroxypropyl group, a 4-hydroxybutyl group, a methoxyethyl group, a 2-acetoxyethyl group, a carboxymethyl group, a 2-carboxyethyl group, a 3-carboxypropyl group, a 2-sulfoethyl group, a 3-sulfopropyl group, a 4-sulfobutyl group, a 3-sulfatepropyl group, a 4-sulfatebutyl group, a N-(methylsulfonyl)-carbamylmethyl group, a 3-(acetylsulfamyl)propyl group, a 4-(acetylsulfamyl)butyl group, etc.), cyclic alkyl groups (for example, a cyclohexyl group), an allyl group ($CH_2=CH-CH_2-$), alkenyl groups (for example, a vinyl group, a propenyl group, a butenyl group, a pentenyl group, a hexenyl group, a heptenyl group, an octenyl group, a dodecynyl group, a pulenyl group, etc.), aralkyl groups (for example, a benzyl group, a phenethyl group, an α-naphthylmethyl group, a β-naphthylmethyl group, etc.), substituted aralkyl groups (for example, a carboxybenzyl group, a sulfobenzyl group, a hydroxybenzyl group, a 3-phenylpropyl group, a methoxybenzyl group, a methylbenzyl group, a chlorobenzyl group, etc.), and also substituted or unsubstituted aryl groups (for example, a phenyl group, a naphthyl group, a tolyl group, a xylyl group, a methoxyphenyl group, a dimethoxyphenyl group, a trimethoxyphenyl group, an ethoxyphenyl group, a dimethylaminophenyl group, a diethylaminophenyl group, a dipropylaminophenyl group, a dibenzylaminophenyl group, a diphenylaminophenyl group, a hydroxyphenyl group, a chlorophenyl group, a dichlorophenyl group, a bromophenyl group, a dibromophenyl group, a nitrophenyl group, etc.

Symbols $r_1$, $r_2$, $r_3$, $r_4$ and $r_5$ each represent a hydrogen atom, a halogen atom (such as a chlorine atom, a bromine atom and an iodine atom), an alkyl group (such as a methyl group, an ethyl group, a n-propyl group, an iso-propyl group, a n-butyl group, a t-butyl group, a n-amyl group, a n-hexyl group, a n-octyl group, a 2-ethylhexyl group and a t-octyl group), an alkoxy group (such as a methoxy group, an ethoxy group, a propoxy group and a butoxy group) or a substituted or unsubstituted aryl group (such as a phenyl group, a tolyl group, a xylyl group, an ethylphenyl group, a methoxyphenyl group, an ethoxyphenyl group, a chlorophenyl group, a nitrophenyl group, a dimethylaminophenyl group, an α-naphthyl group and a β-naphthyl group). Y represents a divalent hydrocarbon group, for example,

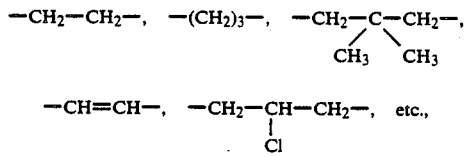

and the 5-membered ring or 6-membered ring of these may be condensed with a benzene ring, a naphthalene ring or the like.

$R_1$ to $R_7$ and $R_1'$ to $R_7'$ each represent a hydrogen atom, a halogen atom (such as a chlorine atom, a bromine atom and an iodine atom), as well as an alkyl group (such as a methyl group, an ethyl group, a n-propyl group, an iso-propyl group, a n-butyl group, a t-butyl group, a n-amyl group, a n-hexyl group, a n-octyl group, a 2-ethylhexyl group and a t-octyl group), an alkoxy group (such as a methoxy group, an ethoxy group, a propoxy group and a butoxy group), a substituted or unsubstituted aryl group (such as a phenyl group, a tolyl group, a xylyl group, an ethylphenyl group, a methoxyphenyl group, an ethoxyphenyl group, a chlorophenyl group, a nitrophenyl group, a dimethylaminophenyl group, an α-naphthyl and a β-naphthyl group), a substituted or unsubstituted aralkyl group (such as benzyl group, a 2-phenylethyl group, a 2-phenyl-1-methylethyl group, a bromobenzyl group, a 2-bromophenylethyl group, a methylbenzyl group, a methoxybenzyl group and a nitrobenzyl group), an acyl group (such as an acetyl group, a propionyl group, a butyryl group, a valeryl group, a benzoyl group, a tolyoyl group, a naphthoyl group, a phthaloyl group and a furoyl group), a substituted or unsubstituted amino group (such as an amino group, a dimethylamino group, a diethylamino group, a dipropylamino group, a acetylamino group and a benzoyl amino group), a substituted or unsubstituted styryl group (such as a styryl group, a dimethylaminostyryl group, a diethylaminostyryl group, a dipropylaminostyryl group, a methoxystyryl group, a dipropylaminostyryl group, a methoxystyryl, an ethoxystyryl group and a methylstyryl group), a nitro group, a hydroxyl group, a carboxyl group, a cyano group or a substituted or unsubstituted arylazo group (such as a phenylazo group, an α-naphthylazo group, a β-naphthylazo group, a dimethylaminophenylazo group, a chlorophenylazo group, a nitrophenylazo group, a methoxyphenylazo group and a tolylazo group).

$R_1'$ to $R_7'$ may also form a condensed ring as in the case of $R_1$ to $R_7$.

$R_8$ represents a hydrogen atom, a nitro group, a cyano group, an alkyl group (such as a methyl group, an ethyl group group, a propyl group and a butyl group) or an aryl group (such as a phenyl group, a tolyl group and a xylyl group).

$R_9$ represents an alkyl group (such as a methyl group, an ethyl group, a propyl group and a butyl group), a substituted alkyl group (such as a 2-hydroxyethyl group a 2-methoxyethyl group, a 2-ethoxyethyl group, a 3-hydroxypropyl group a 3-methoxypropyl group, a 3-ethoxypropyl group, a 3-chloropropyl group, a 3-bromopropyl group and a 3-carboxypropyl group), a cyclic alkyl group (such as a cyclohexyl group and a cyclopropyl group), an allyl group, an aralkyl group (such as a benzyl group, a 2-phenylethyl group, a 3-phenylpropyl group, a 4-phenylbutyl group, an α-naphtylmethyl and a β-naphtylmethyl group), a substituted aralkyl group (such as a methylbenzyl group, an ethylbenzyl group, a dimethylbenzyl group, a trimethylbenzyl group, a chlorobenzyl group and a bromobenzyl group), an aryl group (such as a phenyl group, a tolyl group, a xylyl group, an α-naphthyl group and a β-naphthylgroup) or a substituted aryl group (such as a chlorophenyl group, a dichlorophenyl group, a trichlorophenyl group, an ethylphenyl group, a methoxyphenyl group, a dimethoxyphenyl group, an aminoophenyl group, a nitrophenyl group and a hydroxyphenyl group).

$R_{10}$ represents a substituted or unsubstituted aryl group (such as a phenyl group, a tolyl group, a xylyl group, a biphenyl group, an α-naphthyl group, a β-naphthyl group, an anthranyl group, a pyrenyl group, a methoxyphenyl group, a dimethoxyphenyl group, a trimethoxyphenyl group, an ethoxyphenyl group, a diethoxyphenyl group, a chlorophenyl group, a dichlorophenyl group, a trichlorophenyl group, a bromophenyl group, a dibromophenyl group, a tribromophenyl group, an ethylphenyl group, a diethylphenyl group, a nitrophenyl group, an aminophenyl group, a dimethylaminophenyl group, a diethylaminophenyl group, a dibenzylaminophenyl group, a dipropylaminophenyl group, a morpholinophenyl group, a piperidinylphenyl group, a piperazinophenyl group, a diphenylaminophenyl group, an acetylaminophenyl group, a benzoylaminophenyl group, an acetylphenyl group, a benzoylphenyl group and a cyanophenyl group).

$R_{11}$ represents a monovalent heterocyclic group derived from a heterocyclic ring such as furan, thiophene, benzofuran, thionaphthene, dibenzofuran, carbazole, phenothiazine, phenoxazine or pyridine.

$R_{12}$ represents a hydrogen atom, an alkyl group (such as a methyl group, an ethyl group, a propyl group and a butyl group) or a substituted or unsubstituted aryl group (such as a phenyl group, a tolyl group, a xylyl group, a biphenyl group, an ethylphenyl group, a chlorophenyl group, a methoxyphenyl group, an ethoxyphenyl group, a nitrophenyl group, an aminophenyl group, a dimethylaminophenyl group, a diethylaminophenyl group, an acetylaminophenyl group, an α-naphthyl group, a β-naphthyl group, an anthralyl group and a pyrenyl group).

$R_{13}$ and $R_{14}$ each represent a hydrogen atom, an alkyl group (such as a methyl group, an ethyl group, a propyl group and a butyl group), an alkoxy group (such as a methoxy group, an ethoxy group, a propoxy group, a ethoxyethyl group, and a methoxyethyl group), an aryl group (such as a phenyl group, a tolyl group, a xylyl group, a chlorophenyl group, a biphenyl and a methoxyphenyl group), a substituted or unsubstituted styryl group (such as a styryl group, a p-methylstyryl group, an o-chlorostyryl and a p-methoxystyryl group), a substituted or unsubstituted 4-phenyl-1,3-butadienyl group (such as a 4-phenyl-1,3-butadienyl group and a 4-(p-methylphenyl)-1,3-butadienyl) or a substituted or unsubstituted heterocyclic ring (such as a quinolyl group, a pyridyl group, a carbazolyl group and a furyl group).

M represents a group of atoms necessary for completing a nitrogen-containing heterocyclic ring such as pyridine, thiazole, benzothiazole, naphthothiazole, oxazole, benzoxazole, naththoxazole, imidazole, benzimidazole, naphthoimidazole, 2-quinoline, 4-quinoline, isoquinoline or indole, and may be substituted with a halogen atom (such as a chlorine atom, a bromine atom and an iodine atom), an alkyl group (such as a methyl group, an ethyl group, a propyl group and a butyl group), an aryl group (such as a phenyl group, a tolyl group and a xylyl group) or an aralkyl group (such as benzyl group and a p-tolylmethyl group).

Symbols k and s each are an integer of 0 or 1, and l, m, n each are an integer of 1 or 2.

$X^{\oplus}$ is an anion, representing a chloride ion, a bromide ion, an iodide ion, a perchlorate ion, a benzenesulfonate ion, a p-toluenesulfonate ion, a methylsulfate ion, an ethylsulfate ion, a propylsulfate ion, a tetrafluoroborate ion, a tetraphenylborate ion, a hexafluorophosphate ion, a benzenesulfinate ion, an acetate ion, a trifluoroacetate ion, a propionate ion, a benzoate ion, an oxalate ion, a succinate ion, a malonate ion, an oleate ion, a stearate ion, a citrate ion, a monohydrogendiphosphate ion, a dihydrogenmonophosphate ion, a pentachlorostannate ion, a chlorosulfonate ion a fluorosulfonate ion, a trifluoromethanesulfonate ion, a hexafluoroantimonate ion, a molybdate ion, a tungstate, a titanate ion, a zirconate ion, or the like.

Examples of these coloring matters are shown in Table 1, but by no means limited to these. When $z^{\oplus}$

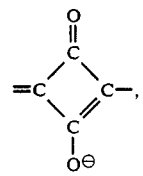

this is indicated as $Z^{\ominus}a$, and when $Z^{\ominus}$ is

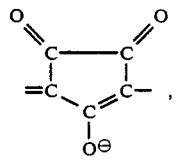

this is indicated as $Z^{\ominus}b$.

For convenience, symbols for compounds in the table are set out below.

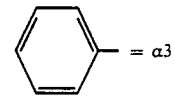
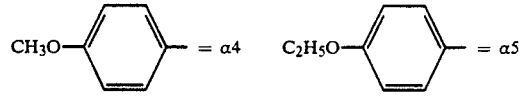
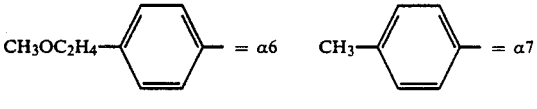
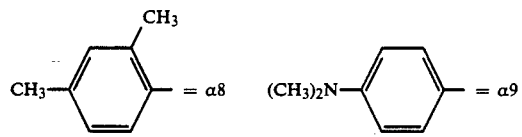
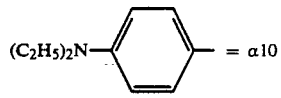
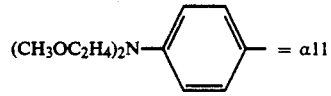
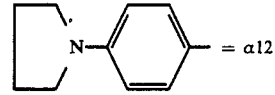
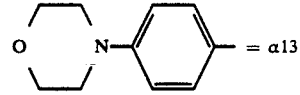
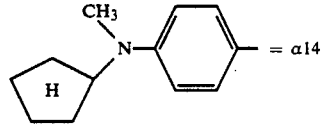

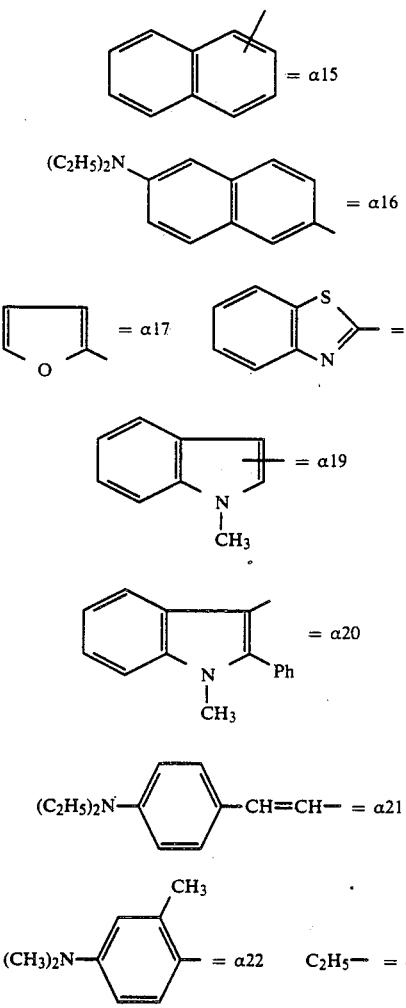

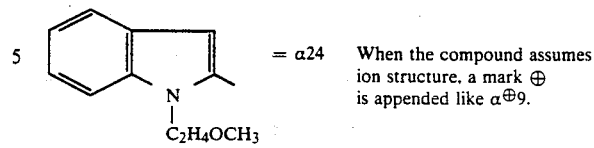

When the compound assumes ion structure, a mark ⊕ is appended like α⊕9.

Also, structures of Y and M are abridged as shown below.

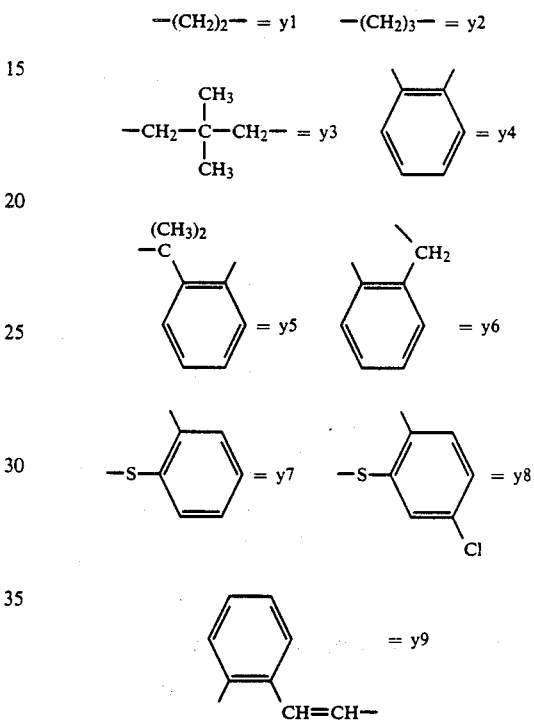

TABLE 1

| No. | Formula | A | B | D | E | r₁' | r₂' | X | |
|---|---|---|---|---|---|---|---|---|---|
| 1 | (I) | α3 | α3 | α3 | α3 | — | — | BF₄ | k = 0, l = 1 |
| 2 | (I) | α9 | α3 | α9 | α3 | — | — | ClO₄ | k = 0, l = 1 |
| 3 | (I) | α9 | α9 | α9 | α9 | — | — | BF₄ | k = 0, l = 1 |
| 4 | (I) | α10 | α3 | α10 | α3 | H | α1 | ClO₄ | k = 1, l = 0 |
| 5 | (I) | α10 | α10 | α10 | α10 | — | — | ClO₄ | k = 0, l = 1 |
| 6 | (I) | α10 | α5 | α10 | α5 | — | — | ClO₄ | k = 0, l = 1 |
| 7 | (I) | α10 | α8 | α10 | α8 | — | — | ClO₄ | k = 0, l = 1 |
| 8 | (I) | α10 | α10 | α9 | α9 | H | α1 | BF₄ | k = 1, l = 0 |
| 9 | (I) | α10 | H | α21 | α21 | — | — | ClO₄ | k = 0, l = 0 |
| 10 | (I) | α10 | α6 | α10 | α6 | α1 | H | ClO₄ | k = 1, l = 0 |
| 11 | (I) | α12 | α12 | α10 | α10 | — | — | ClO₄ | k = 0, l = 1 |
| 12 | (I) | α10 | α15 | α10 | α15 | H | α23 | BF₄ | k = 1, l = 0 |
| 13 | (I) | α16 | α1 | α16 | α1 | — | — | ClO₄ | k = 0, l = 1 |
| 14 | (I) | α10 | α1 | α10 | α1 | — | — | ClO₄ | k = 0, l = 1 |
| 15 | (I) | α9 | α1 | α9 | α1 | H | α1 | ClO₄ | k = 0, l = 1 |
| 16 | (I) | α9 | α2 | α9 | α2 | — | — | ClO₄ | k = 1, l = 0 |
| 17 | (I) | α22 | α9 | α22 | α9 | — | — | ClO₄ | k = 0, l = 1 |
| 18 | (I) | α9 | α17 | α9 | α17 | — | — | ClO₄ | k = 0, l = 1 |

| No. | Formula | A | B | D | E | r₁ | r₂ | r₃ | r₄ | r₅ | X | Y | |
|---|---|---|---|---|---|---|---|---|---|---|---|---|---|
| 19 | (II) | α4 | α4 | α4 | α4 | H | — | — | — | — | Cl | y2 | m = 1 n = 0 |
| 20 | (II) | α9 | α3 | α9 | α3 | H | — | — | — | — | ClO₄ | y2 | m = 0 n = 0 |
| 21 | (II) | α9 | α3 | α9 | α3 | H | — | — | — | — | ClO₄ | y3 | m = 0 n = 0 |
| 22 | (II) | α10 | α10 | α10 | α10 | H | — | — | — | — | ClO₄ | y3 | m = 0 n = 0 |
| 23 | (II) | α9 | α9 | α13 | α13 | H | — | — | — | — | ClO₄ | y2 | m = 0 n = 0 |
| 24 | (II) | α10 | α10 | α10 | α10 | H | — | — | — | — | BF₄ | y6 | m = 0 n = 0 |
| 25 | (II) | α12 | H | α12 | H | Cl | — | — | — | — | ClO₄ | y1 | m = 0 n = 0 |
| 26 | (II) | α9 | α5 | α9 | α5 | H | — | — | — | — | ClO₄ | y1 | m = 0 n = 0 |
| 27 | (II) | α9 | α1 | α9 | α1 | Cl | H | H | H | H | ClO₄ | y2 | m = 1 n = 1 |
| 28 | (III) | α9 | α9 | α9 | α9 | Cl | H | H | — | — | ClO₄ | y2 | |

TABLE 1-continued

| | | | | | | | | | | | | |
|---|---|---|---|---|---|---|---|---|---|---|---|---|
| 29 | (III) | α9 | α9 | α9 | α9 | H | α1 | H | α1 | — | ClO$_4$ | y3 |
| 30 | (III) | α9 | α5 | α9 | α5 | Cl | H | H | — | — | ClO$_4$ | y2 |
| 31 | (IV) | α3 | α3 | α3 | α3 | H | H | H | H | — | BF$_4$ | — m = n = 1 Z = Z$_a$ |
| 32 | (IV) | α9 | α9 | α9 | α9 | — | — | — | — | — | ClO$_4$ | — m = n = 0 Z = Z$_a$ |
| 33 | (IV) | α10 | α10 | α10 | α10 | H | α1 | H | α1 | — | BF$_4$ | — m = n = 2 Z = Z$_b$ |
| 34 | (IV) | α9 | α5 | α9 | α5 | — | — | — | — | — | ClO$_4$ | — m = n = 0 Z = Z$_b$ |
| 35 | (IV) | α9 | α7 | α9 | α7 | H | H | H | H | — | ClO$_4$ | — m = n = 1 Z = Z$_b$ |
| 36 | (IV) | α10 | α10 | α10 | α10 | — | — | — | — | — | ClO$_4$ | — m = n = 0 Z = Z$_a$ |
| 37 | (IV) | α10 | α3 | α10 | α3 | — | — | — | — | — | ClO$_4$ | — m = n = 0 Z = Z$_b$ |
| 38 | (IV) | α14 | α3 | α14 | α3 | — | — | — | — | — | BF$_4$ | — m = n = 0 Z = Z$_a$ |

| No. | Formula | F | X | |
|---|---|---|---|---|
| 39 | (V) | (3) | ClO$_4$ | $R_1 = R_3 = R_5 = R_6 = R'_1 = R'_3 = R'_5 = R'_6 = H$ $R_2 = R_7 = R'_2 = R'_7 = CH_3$ $R_4 = R'_4 = CH(CH_3)_2$ $R_8 = NO_2$ n = 1 |
| 40 | (V) | (3) | ClO$_4$ | $R_1 = R_3 = R_5 = R_6 = R'_1 = R'_3 = R'_5 = R'_6 = H$ $R_2 = R_7 = R'_2 = R'_7 = CH_3$ $R_4 = R'_4 = CH(CH_3)_2$ $R_8 = H$ n = 2 |
| 41 | (V) | (3) | I | $R_1 = R_4 = R_6 = R'_1 = R'_4 = R'_6 = H$ $R_5 = R_7 = R'_5 = R'_7 = CH_3$ $R_2, R_3$ and $R'_2, R'_3$ are cyclized with $-(CH_2)-$ n = 0 |
| 42 | (V) | (3) | ClO$_4$ | $R_1 = R_2 = R_3 = R_4 = R_5 = R_6 = R_7 = R'_1 = R'_2 = R'_3 = R'_4 = R'_5 = R'_6 = R'_7 = R'_8 = H$ n = 2 |
| 43 | (V) | (6) | ClO$_4$ | $R_1 = R_3 = R_5 = R_6 = H$ $R_2 = R_7 = CH_3$ $R_4 = CH(CH_3)_2$ $R_9 = C_2H_5$ k = 0 p = 5 M = y5 |
| 44 | (V) | (6) | ClO$_4$ | $R_1 = R_3 = R_5 = R_6 = H$ $R_2 = R_7 = R_9 = CH_3$ $R_4 = CH(CH_3)_2$ k = 1 p = 3 M = y4 |
| 45 | (V) | (8) | ClO$_4$ | $R_1 = R_2 = R_4 = R_6 = H$ $R_3 = R_7 = CH_3$ $R_2 = OC_2H_5$ $R_{10} = α10$ p = 5 q = 1 |
| 46 | (V) | (9) | ClO$_4$ | $R_1 = R_3 = R_5 = R_6 = H$ $R_2 = R_7 = CH_3$ $R_4 = CH(CH_3)_2$ $R_{11} = α19$ p = 5 q = 1 |
| 47 | (V) | (9) | BF$_4$ | $R_1 = R_3 = R_6 = H$ $R_2 = R_7 = CH_3$ $R_4$ and $R_5$ are combined to form $-S-CH=C(CH_3)-$ $R_{11} = α18$ p = 5 q = 1 |
| 48 | (V) | (10) | ClO$_4$ | $R_1 = R_3 = R_5 = R_6 = H$ $R_2 = R_7 = CH_3$ $R_4 = CH(CH_3)_2$ $R_{10} = R_{12} = α10$ p = 4 q = 1 |
| 49 | (V) | (11) | ClO$_4$ | $R_1 = R_3 = R_5 = R_6 = H$ $R_2 = R_7 = CH_3$ $R_4 = CH(CH_3)_2$ $R_{10} = α10$ p = 3 |
| 50 | (V) | (12) | ClO$_4$ | $R_1 = R_3 = R_5 = R_6 = H$ $R_2 = R_7 = CH_3$ $R_4 = CH(CH_3)_2$ p = 3 q = 1 k = 0 L = S $Z_{12} = -CH=\overset{Ph}{C}-CH=\overset{Ph}{C}-$ |
| 51 | (V) | (12) | ClO$_4$ | $R_1 = R_2 = R_4 = R_6 = R_{13} = H$ $R_3 = R_5 = R_7 = CH_3$ $R_{14} = Ph$ p = 3 q = 1 k = 1 L = Te $Z_{12} = -CH=\overset{Ph}{C}-$ |
| 52 | (V) | (12) | BF$_4$ | $R_1 = R_3 = R_5 = R_6 = H$ $R_2 = R_7 = CH_3$ $R_4 = CH(CH_3)_2$ p = 3 q = 1 k = 0 L = 0 $Z_{12} = -\overset{Ph}{C}=C$ (pyridyl) |
| 53 | (VI) | (1) | — | $R_1 = R_3 = R_5 = R_6 = H$ $R_2 = R_7 = CH_3$ $R_4 = CH(CH_3)_2$ |
| 54 | (VI) | (1) | — | $R_1 = R_5 = R_6 = R_7 = H$ $R_2 = CH_3$ $R_3$ and $R_4$ are combined to form $-S-CH=C(CH_3)-$ |
| 55 | (VI) | (1) | — | $R_1 = R_2 = R_4 = R_6 = H$ $R_3 = R_7 = CH_3$ $R_5 = -Ph$ |
| 56 | (VI) | (2) | — | $R_1 = R_3 = R_5 = R_6 = H$ $R_2 = R_7 = CH_3$ $R_4 = CH(CH_3)_2$ |
| 57 | (VI) | (2) | — | $R_1 = R_2 = R_4 = R_6 = H$ $R_3 = R_7 = CH_3$ $R_5 = OC_2H_5$ |
| 58 | (VII) | (4) | ClO$_4$ | $R_1 = R_3 = R_5 = R_6 = H$ $R_2 = R_7 = CH_3$ $R_4 = CH(CH_3)_2$ p = 1 |
| 59 | (VII) | (4) | I | $R_1 = R_2 = R_4 = R_6 = H$ $R_3 = R_5 = R_7 = CH_3$ p = 1 |
| 60 | (VII) | (4) | ClO$_4$ | $R_1 = R_4 = R_6 = H$ $R_3 = R_5 = R_7 = CH_3$ $R_2 = NO_2$ p = 3 |
| 61 | (VII) | (5) | ClO$_4$ | $R_1 = R_3 = R_5 = R_6 = H$ $R_2 = R_7 = CH_3$ $R_4 = CH(CH_3)_2$ $R'_1 = R'_3 = R'_5 = R'_6 = R'_7 = H$ |
| 62 | (VII) | (5) | ClO$_4$ | $R_1 = R_2 = R_3 = R_4 = R_6 = R_7 = R'_1 = R'_3 = R'_5 = R'_6 = R'_7 = H$ $R_5 = n-C_8H_{17}$ |
| 63 | (VII) | (7) | BF$_4$ | $R_1 = R_3 = R_5 = R_6 = H$ $R_2 = R_7 = CH_3$ $R_4 = CH(CH_3)_2$ $R_9 = C_2H_5$ k = 0 p = 5 M = y8 |
| 64 | (VII) | (7) | ClO$_4$ | $R_1 = R_3 = R_5 = R_6 = H$ $R_2 = R_7 = CH_3$ $R_4 = CH(CH_3)_2$ k = 0 p = 5 M = y8 |
| 65 | (VII) | (8) | ClO$_4$ | $R_1 = R_3 = R_5 = R_6 = H$ $R_2 = R_7 = CH_3$ $R_4 = CH(CH_3)_2$ $R_{10} = α^{\oplus}9$ p = 6 q = 2 |
| 66 | (VII) | (9) | ClO$_4$ | $R_1 = R_2 = R_3 = R_4 = R_6 = R_7 = H$ $R_5 = n-C_8H_{17}$ $R_{11} = α^{\oplus}24$ p = 4 q = 2 |
| 67 | (VII) | (10) | ClO$_4$ | $R_1 = R_3 = R_5 = R_6 = H$ $R_2 = R_7 = CH_3$ $R_4 = CH(CH_3)_2$ $R_{10} = α10$ $R_{12} = α^{\oplus}10$ p = 3 q = 2 |

TABLE 1-continued

| 68 | (VII) | (11) | ClO$_4$ | $R_1 = R_3 = R_5 = R_6 = R_{13} = H$ $R_2 = R_7 = CH_3$ $R_4 = CH(CH_3)_2$ $R_{14} = Ph$ $p = 2$ $q = 2$ $k = 1$ $L = Te^\oplus$ $Z_{12} = -CH=\overset{Ph}{\underset{|}{C}}-$ |

| No. | Formula | X | $Z_1$ | $Z_2$ | M | |
|---|---|---|---|---|---|---|
| 69 | VIII | ClO$_4$ | $-\overset{Ph}{\underset{|}{C}}=CH-$ | $-CH=\overset{Ph}{\underset{|}{C}}-$ | — | $L_1 = L_2 = S$ $n = k = s = 1$ $r_1' = r_4' = Ph$ $r_2' = r_3' = r_5' = r_6' = r_7' = H$ |
| 70 | VIII | ClO$_4$ | $-\overset{t-C_4H_9}{\underset{|}{C}}=CH-$ | $-CH=\overset{t-C_4H_9}{\underset{|}{C}}-$ | — | $L_1 = Te$ $L_2 = O$ $n = k = s = 1$ $r_1' = r_4' = t-C_4H_9$ $r_2' = r_3' = r_5' = r_6' = r_7' = H$ |
| 71 | VIII | ClO$_4$ | $-\overset{Ph}{\underset{|}{C}}=CH-$ | $-CH=\overset{Ph}{\underset{|}{C}}-$ | — | $L_1 = Te$ $L_2 = S$ $n = k = s = 1$ $r_1' = r_4' = Ph$ $r_2' = r_3' = r_5' = r_6' = r_7' = H$ |
| 72 | IX | I | — | $-CH=\overset{Ph}{\underset{|}{C}}-CH=\overset{Ph}{\underset{|}{C}}-$ | y7 | $L_2 = O$ $r_1 = H$ $r_1' = C_2H_5$ $k = s = l = 0$ $Y = y3$ |
| 73 | IX | ClO$_4$ | — | $-CH=\overset{Ph}{\underset{|}{C}}-$ | y9 | $L_2 = Te$ $r_1' = C_2H_5$ $r_1 = Cl$ $r_2' = H$ $r_1' = Ph$ $k = 1$ $l = s = 0$ $Y = y2$ |
| 74 | X | — | $-\overset{t-C_4H_9}{\underset{|}{C}}=CH-$ | $-CH=\overset{t-C_4H_9}{\underset{|}{C}}-$ | — | $L_1 = L_2 = S$ $r_1' = r_4' = t-C_4H_9$ $Z = Za$ $s = k = 1$ $r_2' = r_3' = H$ |
| 75 | X | — | $-\overset{Ph}{\underset{|}{C}}=CH-$ | $-CH=\overset{Ph}{\underset{|}{C}}-$ | — | $L_1 = L_2 = S$ $r_1' = r_4' = Ph$ $r_2' = r_3' = H$ $Z = Zb$ $s = k = 1$ |
| 76 | XI | ClO$_4$ | $-\overset{Ph}{\underset{|}{C}}=CH-$ | — | — | $L_1 = Te$ $r_1' = Ph$ $r_2' = r_4' = r_5' = H$ $R_{15} = \alpha11$ $n = 2$ $k = 1$ |
| 77 | XI | ClO$_4$ | $-\overset{Ph}{\underset{|}{C}}=CH-\overset{Ph}{\underset{|}{C}}=CH-$ | — | — | $L_1 = S$ $r_4' = r_5' = H$ $R_{15} = \alpha9$ $n = 2$ $k = 0$ |
| 78 | XI | ClO$_4$ | $-\overset{Ph}{\underset{|}{C}}=CH-$ | — | — | $L_1 = S$ $r_1' = Ph$ $r_2' = r_4' = r_5' = H$ $R_{15} = \alpha20$ $n = 2$ $k = 1$ |

In the present invention, the recording layer may be provided by using alone the organic coloring matters as described above. The organic coloring matters may also contain metallic chelate compounds, other infrared-absorptive coloring matters and binders for the purposes of storage stability, prevention of deterioration with time, etc. of the recording layer. In this occasion, the organic coloring matter may desirably be contained in an amount of from about 50 to 99% by weight, preferably from 70 to 90% by weight, based on the total amount of the recording materials that form the recording layer.

Suitable binders can be selected from resins covering a wide range. Specifically, there can be used cellulose esters such as nitrocellulose, cellulose phosphate, cellulose sulfate, cellulose acetate, cellulose propionate, cellulose butyrate, cellulose myristate, cellulose palmitate, cellulose acetate propionate and cellulose acetate butyrate; cellulose ethers such as methyl cellulose, ethyl cellulose, propyl cellulose and butyl cellulose; vinyl resins such as polystyrene, polyvinyl chloride, polyvinyl acetate, polyvinyl butyral, polyvinyl acetal, polyvinyl alcohol and polyvinyl pyrrolidone; copolymer resins such as a styrene/butadiene copolymer, a styrene/acrylonitrile copolymer, a styrene/butadiene/acrylonitrile copolymer and a vinyl chloride/vinyl acetate copolymer; acrylic resins such as polymethyl methacrylate, polymethyl acrylate, polybutyl acrylate, polyacrylic acid, polymethacrylic acid, polyacrylamide and polyacrylonitrile; polyesters such as polyethylene terephthalate; polyarylate resins such as poly(4,4'-isopropylidenediphenilene-co-1,4-cyclohexylenedimethylene carbonate), poly(ethylenedioxy-3,3'-phenylene thiocarbonate), poly(4,4'-isopropylidenediphenilene carbonate-co-terephthalate), poly(4,4'-isopropylidenediphenilene carbonate), poly(4,4'-sec-butyridenediphenylene carbonate) and poly(4,4'-isopropylidenediphenilene carbonate-block-oxyethylene); or polyamides, polyimides, epoxy resins, phenol resins, polyolefins such as polyethylene, polypropylene and chlorinated polyethylene, etc.

As the organic solvent that can be used when the recording layers are provided by coating, though variable depending on whether the materials are used in a dispersed state or a dissolved state, there can be used, in general, alcohols such as methanol, ethanol and isopropanol; ketones such as acetone, methyl ethyl ketone and cyclohexanone; amides such as N,N-dimethylformamide and N,N-dimethylacetamide; sulfoxides such as dimethylsulfoxide; ethers such as tetrahydrofuran, dioxane, and ethylene glycol monomethyl ether; esters such as methyl acetate, ethyl acetate and butyl acetate; aliphatic hydrocarbon halides such as chloroform, methylene chloride, dichloroethylene, dichloroethane, carbon tetrachloride and trichloroethylene; aromatics such as benzene, toluene, xylene, monochlorobenzene, dichlorobenzene and anisole; etc.

The coating can be carried out by using coating methods such as dip coating, spray coating, spinner coating, bead coating, Meyer bar coating, blade coating, roller coating and curtain coating.

As materials for the substrate, preferred in instances in which the recording and/or reproducing light is irradiated from the substrate side are those that may have less difficulties in optical recording and reproducing, and there may be used any of those having a high transmittance to the light to be used, as exemplified by acrylic resins, polyester resins, polycarbonate resins, vinyl type resins, polysulfone resins, polymide resins, polyacetal resins, polyolefin resins, polyamide resins, cellulose derivatives, etc.

In instances in which the recording and/or reproducing light is irradiated from the side reverse to the substrate, it is also possible to use materials which are opaque to the recording and/or reproducing light, and specifically there may be used polyvinyl chloride, fluorine-substituted ethylene polymers, a vinyl chloride/vinyl acetate copolymer, polyvinylidene chloride, acrylic polymers such as methyl polymethacrylate, polystyrene, polyvinyl butyral, acetylcellulose, a styrene/butadiene copolymer, polyethylene, polypropylene, polycarbonate, an epoxyacrylonitrile/butadiene/styrene copolymer, etc.

In some instances, it is possible to use a great variety of materials depending on the purposes, including sheets of metals such as iron, stainless steel, aluminum, tin, cupper and zinc, synthetic paper, paper, as well as fiber reinforced plastics, composite materials of plastics with powder of metals such as magnetic materials, ceramics, etc.

There is no particular limitation in the method of forming the track grooves on this substrate, and may be included an injection process, a compression process, a cast molding process, a 2P process. In the injection process, compression process and cast molding process of the above, the track grooves are directly formed on the substrate. In the 2P process, a photocurable resin composition is coated on the substrate, and thereafter an original disc is closely contacted thereon, followed by uniform exposure to radiations (such as ultraviolet rays and X-rays) to cure the photocuring resin composition, whereby the pattern on a form is transferred and the track grooves are formed on the photocuring resin composition.

As having described in the above, the optical recording medium according to the present invention can improve the CN ratio, and also an optical recording medium suffering less deterioration by reproducing light can be obtained.

EXAMPLES

The present invention will be described below in greater detail by giving Examples.

EXAMPLE 1

On an acrylic disc substrate of 130 mm in diameter and 15 mm in inner diameter, track grooves of 750 Å in depth were provided by a compression process, and thereafter the AS-layer comprising a compound wherein a part of polysiloxane was substituted with poly(butyl methacrylate) resins was formed thereon with a thickness of 400 Å. Thereafter, laminated on that layer was the S-layer comprising polysiloxane as the compound having a polysiloxane bond, with a thickness of 200 Å. An organic coloring matter corresponding to No. 2 of the coloring matters set out above was provided thereon by spinner coating to form a recording layer with a thickness of from 700 Å to 900 Å, thus obtaining an optical recording medium.

From the substrate side of the optical recording medium thus obtained, writing was performed by using a semiconductor laser beam of 830 nm, under the rotation number of 1,800 rpm, recording frequency of 2 MHz and recording power of 6 mW to measure the read-out power ($P_R$) and CN value. Using this optical recording medium, reproduction was further repeated $5 \times 10^4$ times to measure the CN value.

EXAMPLES 2 to 6

Example 1 was repeated but replacing the materials for the AS-layer, the film thickness of AS-layer, the film thickness of S-layer and the coloring matters used in the recording layer with those as shown in Table 2 below, and measured on the respective optical recording mediums in the same manner as in Example 1 were the read-out power ($P_R$) and the CN values observed at the initial stage and after the reproduction was repeated $5 \times 10^4$ times.

EXAMPLE 7

On an acrylic disc substrate of 130 mm in diameter and 15 mm in inner diameter, track grooves of 750 Å in depth were provided by a compression process, and thereafter the S-layer comprising polysiloxane as the compound having a polysiloxane bond was provided thereon with a thickness of 200 Å. Further laminated on that layer with a thickness of 400 Å was the AS-layer comprising a compound wherein a part of polysiloxane was substituted with poly(butyl methacrylate) resins. An organic coloring matter corresponding to No. 2 of the coloring matters set out above was provided thereon by spinner coating to form a recording layer with a thickness of from 750 Å, thus obtaining an optical recording medium.

The optical recording medium thus obtained was evaluated under the same conditions as in Example 1.

COMPARATIVE EXAMPLE 1

On an acrylic disc substrate of 130 mm in diameter and 15 mm in inner diameter, track grooves of 750 Å in depth were provided by a compression process, and thereafter the AS-layer comprising as the compound having a siloxane bond and subjected to acrylic modification, a compound wherein a part of polysiloxane was substituted with butyl methacrylate was formed thereon with a thickness of 400 Å. Thereafter, an organic coloring matter corresponding to No. 5 of the coloring matters set out above was provided thereon by spinner coating to form a recording layer with a thickness of from 700 Å to 900 Å, thus obtaining an optical recording medium.

The optical recording medium thus obtained was evaluated under the same conditions as in Example 1.

COMPARATIVE EXAMPLES 2 to 4

As shown in Table 2 below, on two kinds of substrates on which a subbing layer comprised only of S-layer was formed with a varied film thickness and another substrate on which no subbing layer was provided, recording layers of 700 to 900 Å were each formed by spinner coating with use of the coloring matter as shown in Table 2 to form the respective optical recording mediums.

The optical recording medium thus obtained was evaluated under the same conditions as in Example 1.

Results of the above Examples 1 to 7 and Comparative Examples 1 to 4 are shown in Table 2.

TABLE 2

| Example | Coloring matter No. | AS-layer component | AS-layer thickness (Å) | S-layer thickness (Å) | $P_R$ (mW) | Initial CN (dB) | CN after repetition (dB) |
|---|---|---|---|---|---|---|---|
| 1 | 2 | BMA* | 400 | 200 | 1.1 | 48.0 | 47.0 |
| 2 | 5 | EA/S** | 400 | 200 | 1.1 | 46.5 | 45.8 |
| 3 | 22 | BMA* | 300 | 200 | 1.1 | 45.8 | 44.7 |
| 4 | 40 | BMA* | 300 | 200 | 1.1 | 49.5 | 48.0 |
| 5 | 40 | BMA* | 1000 | 600 | 1.2 | 49.0 | 48.1 |
| 6 | 71 | BMA* | 1000 | 600 | 1.2 | 49.5 | 48.0 |
| 7 | 2 | BMA* | 400 | 200 | 1.1 | 49.0 | 47.0 |
| Comparative Example: | | | | | | | |
| 1 | 5 | BMA* | 400 | — | 0.9 | 46.0 | 32.0 |
| 2 | 5 | — | — | 600 | 1.1 | 42.5 | 41.0 |
| 3 | 5 | — | — | 100 | 1.1 | 43.0 | 37.0 |
| 4 | 40 | — | — | — | 0.9 | 44.0 | 38.5 |

*Poly(butyl methacrylate) resins
**Ethyl acrylate/styrene copolymer

What is claimed is:

1. An optical recording medium, comprising:
a substrate having track grooves, a subbing layer and a recording layer;
said subbing layer comprising a layer which contains polysiloxane and a layer which contains polysiloxane substituted with acrylic resin;
wherein said polysiloxane-containing layer has a higher thermal conductivity than said layer containing acrylic resin-substituted polysiloxane.

2. The optical recording medium of claim 1, wherein said subbing layer is substantially flat on its surface opposite to the side coming in contact with the substrate.

3. The optical recording medium of claim 1, wherein said layer comprising polysiloxane substituted with acrylic resin has a thickness of from 150 Å to 10,000 Å.

4. The optical recording medium of claim 3, wherein said layer comprising polysiloxane substituted with acrylic resin has a thickness of from 200 Å to 2,000 Å.

5. The optical recording medium of claim 1, wherein said layer comprising polysiloxane is laminated on said layer comprising polysiloxane substituted with acrylic resin.

6. The optical recording medium of claim 5, wherein said layer comprising polysiloxane has a thickness of from 150 Å to 2,000 Å.

7. The optical recording medium of claim 6, wherein said layer comprising polysiloxane has a thickness of from 200 Å to 700 Å.

8. The optical recording medium of claim 1, wherein said layer comprising polysiloxane substituted with acrylic resin is laminated on said layer comprising polysiloxane.

9. The optical recording medium of claim 8, wherein said layer comprising polysiloxane has a thickness of from 50 Å to 900 Å.

10. The optical recording medium of claim 9, wherein said layer comprising polysiloxane has a thickness of from 200 Å to 600 Å.

11. The optical recording medium of claim 1, wherein said recording layer contains an organic coloring matter.

12. The optical recording medium of claim 11, wherein said organic coloring matter is a compound represented by Formula (I):

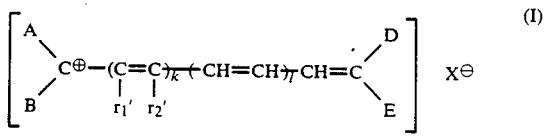

wherein, A, B, D and E each represent a hydrogen atom, an alkyl group, an alkenyl group, a substituted or unsubstituted aralkyl group, aryl group, a styryl group, a substituted styryl group, a heterocyclic group, or a substituted heterocyclic group; $r_1'$ and $r_2'$ each represent a hydrogen atom, an alkyl group, a cyclic alkyl group, an alkenyl group, an aralkyl group, a substituted aralkyl group or an aryl group; and k represents 0 or 1; l represents an integer of 0, 1 or 2; and $X^\ominus$ represents an anion.

13. The optical recording medium of claim 11, wherein said organic coloring matter is a compound represented by Formula (II), (III) or (IV):

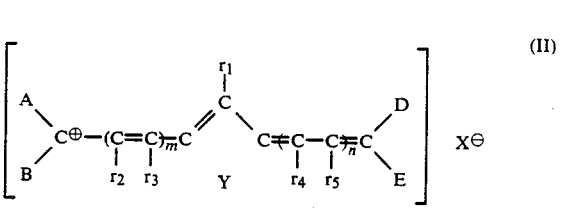

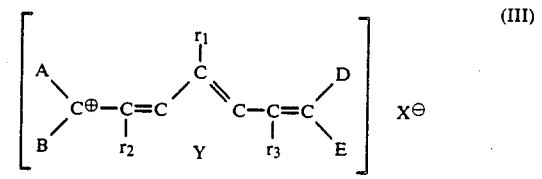

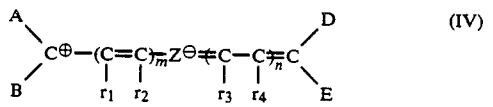

wherein A, B, D and E each represent a hydrogen atom, an alkyl group, alkenyl group, a substituted or unsubstituted aralkyl group, a substituted or unsubstituted aryl group, a styryl group, a substituted styryl group, a heterocyclic group, or a substituted heterocyclic group $X^\ominus$ represents an anion; $r_1, r_2, r_3, r_4$ and $r_5$ each represent a hydrogen atom, a halogen atom, an alkyl group or an aryl group; Y represents a divalent residual group having a group of atoms necessary for completing a ring of 5 or 6 members; m and n each represent an integer of 0, 1 or 2; and $Z^\ominus$ represents

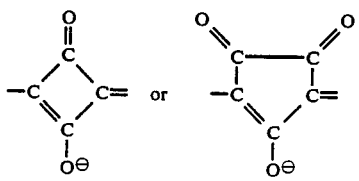

14. The optical recording medium of claim 11, wherein said organic coloring matter is a compound represented by Formula (V), (VI) or (VII):

with $R_6$ and $R_6$ with $R_7$; $X^\ominus$ represents an anion; and F represents a divalent organic residual group.

15. The optical recording medium of claim 11, wherein said organic coloring matter is a compound represented by Formula (VIII), (IX), (X) and (XI) shown below.

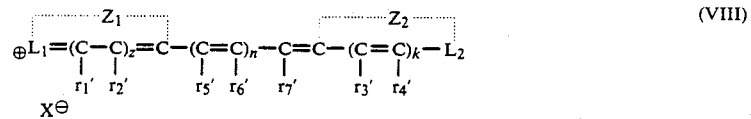 (VIII)

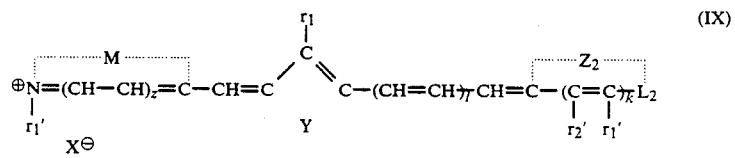 (IX)

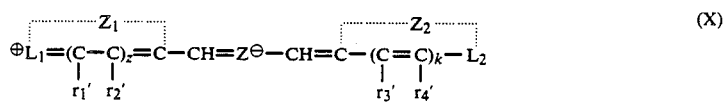 (X)

 (XI)

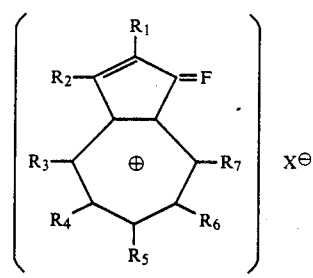 (V)

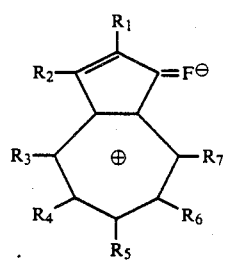 (VI)

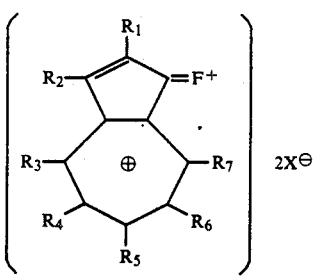 (VII)

wherein $R_1$, $R_2$, $R_3$, $R_4$, $R_5$, $R_6$ and $R_7$ each represent a hydrogen atom, a halogen atom, an alkyl group, an aryl group, a substituted or unsubstituted aralkyl group, a substituted or unsubstituted amino group, a substituted or unsubstituted styryl group, a nitro group, a hydroxyl group, a carboxyl group, a cyano group or an arylazo group, and a substituted or unsubstituted heterocyclic ring may be formed by at least one of the combinations of $R_1$ with $R_2$, $R_2$ with $R_3$, $R_3$ with $R_4$, $R_4$ with $R_5$, $R_5$ with $R_6$ and $R_6$ with $R_7$; $X^\ominus$ represents an anion; and F represents a divalent organic residual group.

wherein $L_1$ and $L_2$ each represent, a sulfuratom, an oxygen atom, a selenium atom or a tellurium atom; $Z_1$ represents a group of atoms necessary for completing a pyrylium skeleton that may be substituted; $Z_2$ represents a group of atoms necessary for completing a pyran skeleton that may be substituted; $R_{15}$ represents an aryl group or a substituted or unsubstituted heterocyclic group; M represents a group of non-metallic atoms sufficient for the formation of a nitrogen-containing heterocyclic ring; $r_1$ represents a hydrogen atom, a halogen atom, an alkyl group or an aryl group; $r_1'$, $r_2'$, $r_3'$, $r_4'$, $r_5'$, $r_6'$ and $r_7'$ each represent a hydrogen atom, an alkyl group, a cyclic alkyl group, an alkenyl group, an aralkyl group, a substituted aralkyl group or an aryl group; $X^\ominus$ represents an anion; k represents an integer of 0 or 1; l and n each represent an integer of 0, 1 or 2; s represents an integer of 0 or 1; Y represents a divalent residual group having a group of atoms necessary for completing a ring of 5 or 6 members; and $2^\ominus$ represents

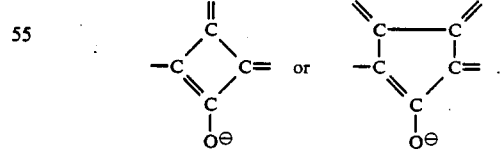

16. An optical recording medium comprising:
a substrate having track grooves;
a subbing layer comprising a layer which contains polysiloxane and a layer which contains polysiloxane substituted with acrylic resin; and
a recording layer.

17. The optical recording medium of claim 16, wherein said subbing layer has two opposing surfaces, one of said surfaces being in contact with the substrate and the other of said surfaces being substantially flat.

18. The optical recording medium of claim 16, wherein said layer comprising polysiloxane substituted with acrylic resin has a thickness of from 150 Å to 10,000 Å.

19. The optical recording medium of claim 18, wherein said layer comprising polysiloxane substituted with acrylic resin has a thickness of from 200 Å to 2,000 Å.

20. The optical recording medium of claim 16, wherein said layer comprising polysiloxane is laminated on said layer comprising polysiloxane substituted with acrylic resin.

21. The optical recording medium of claim 20, wherein said layer comprising polysiloxane has a thickness of from 150 Å to 2,000 Å.

22. The optical recording medium of claim 21, wherein said layer comprising polysiloxane has a thickness of from 200 Å to 700 Å.

23. The optical recording medium of claim 16, wherein said layer comprising polysiloxane substituted with acrylic resin is laminated on said layer comprising polysiloxane.

24. The optical recording medium of claim 23, wherein said layer comprising polysiloxane has a thickness of from 50 Å to 900 Å.

25. The optical recording medium of claim 24, wherein said layer comprising polysiloxane has a thickness of from 200 Å to 600 Å.

26. The optical recording medium of claim 16, wherein said recording layer further comprises an organic coloring matter.

27. The optical recording medium of claim 26, wherein said organic coloring matter is a compound represented by Formula (I):

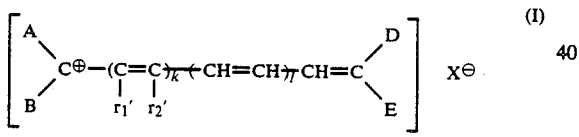

wherein A, B, D and E independently represent a hydrogen atom, a substituted or unsubstituted alkyl group, a substituted or unsubstituted alkenyl group, a substituted or unsubstituted aralkyl group, a substituted or unsubstituted aryl group, a styryl or a substituted styryl group, a heterocyclic or a substituted heterocyclic group; $r_1'$ and $r_2'$ independently represent a hydrogen atom, a substituted or unsubstituted alkyl group, a substituted or unsubstituted cyclic alkyl group, a substituted or unsubstituted alkenyl group, an aralkyl or a substituted aralkyl group or a substituted or unsubstituted aryl group; k represents 0 or 1; l represents 0, 1 or 2; and $X^{\ominus}$ represents an anion.

28. The optical recording medium of claim 26, wherein said organic coloring matter is a compound represented by any of Formulae (II), (III) or (IV):

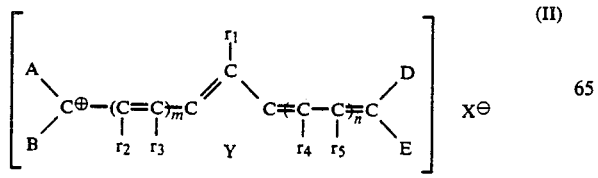

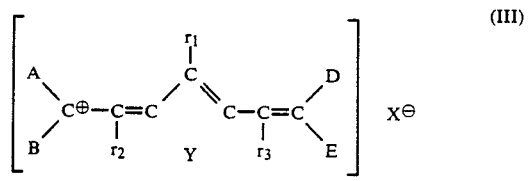

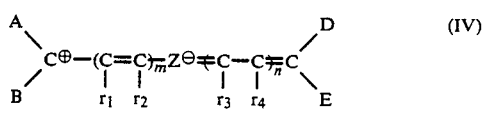

wherein A, B, D and E independently represent a hydrogen atom, a substituted or unsubstituted alkyl group, a substituted or unsubstituted alkenyl group, a substituted or unsubstituted aralkyl group, a substituted or unsubstituted aryl group, a styrl group, a substituted styryl group, a heterocyclic or a substituted heterocyclic group; $X^{63}$ represents an anion; $r_1$, $r_2$, $r_3$, $r_4$ and $r_5$ independently represent a hydrogen atom, a halogen atom, a substituted or unsubstituted alkyl group or a substituted or unsubstituted aryl group; Y represents a divalent residual group having a group of atoms necessary for completing a ring of 5 or 6 members; m and n independently represent 0, 1 or 2; and $Z^{\ominus}$ represents

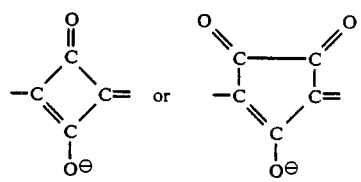

29. The optical recording medium of claim 26, wherein said organic coloring matter is a compound represented by any of Formulae (V), (VI) or (VII):

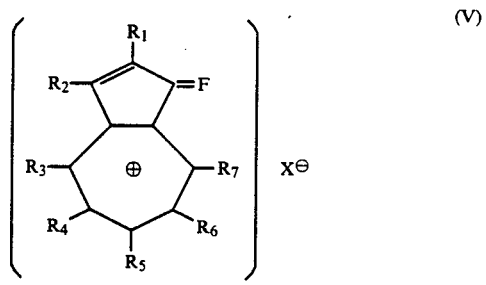

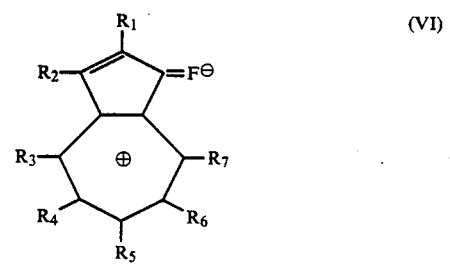

-continued represented by any of Formulae (VIII), (IX), (X) and (XI):

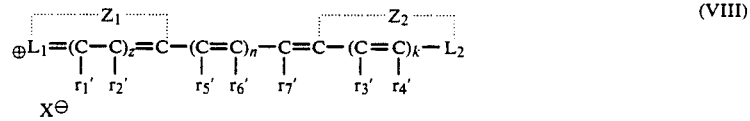
(VIII)

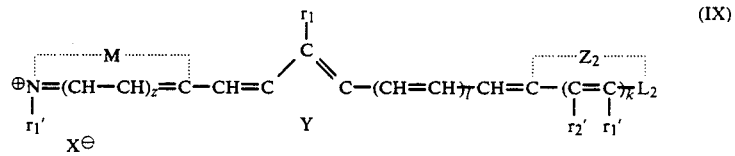
(IX)

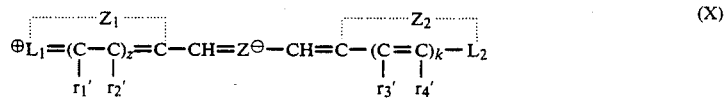
(X)

(XI)

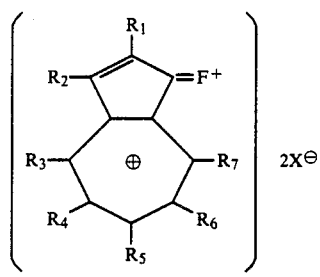

wherein $R_1$, $R_2$, $R_3$, $R_4$, $R_5$, $R_6$ and $R_7$ independently represent a hydrogen atom, a halogen atom, a substituted or unsubstituted alkyl group, a substituted or unsubstituted aryl group, a substituted or unsubstituted aralkyl group, a substituted or unsubstituted amino group, a substituted or unsubstituted styryl group, nitro, hydroxyl, carboxyl, cyano, or arylazo groups, and a substituted or unsubstituted heterocyclic ring may be formed by at least one of the combination of ($R_1$ with $R_2$), ($R_2$ with $R_3$), ($R_3$ with $R_4$), ($R_4$ with $R_5$), ($R_5$ with $R_6$) and ($R_6$ with $R_7$); $X^\ominus$ represents an anion; and F represents a divalent organic residual group.

30. The optical recording medium of claim 26, wherein said organic coloring matter is a compound wherein $L_1$ and $L_2$ independently represent sulfur, oxygen, selenium or tellurium atoms; $Z_1$ represents a group of atoms necessary for completing a pyrrylium skeleton (which may be substituted or unsubstituted; $Z_2$ represents a group of atoms necessary for completing a pyran skeleton which may be substituted or unsubstituted; $R_{1s}$ represents an aryl group or a substituted or unsubstituted heterocyclic group; M represents a group of nonmetallic atoms sufficient for the formation of a nitrogen-containing heterocyclic ring; $r_1$ represents hydrogen or halogen atoms, an alkyl group or an aryl group; $r_1'$, $r_2'$, $r_3'$, $r_4'$, $r_5'$, $r_6'$ and $r_7'$ independently represent a hydrogen atom, an alkyl group, a cyclic alkyl group, an alkenyl group, an aralkyl group, a substituted aralkyl group or an aryl group; $X^\ominus$ represents an anion, k represents 0 or 1; l and n independently represent 0, 1 or 2; s represents 0 or 1, Y represents a divalent residual group having a group of atoms necessary for completing a ring of 5 or 6 member; and $Z^\ominus$ represents

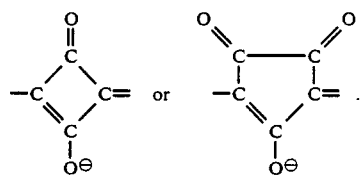

* * * * *

UNITED STATES PATENT AND TRADEMARK OFFICE
CERTIFICATE OF CORRECTION

PATENT NO. : 5,100,766
DATED : March 31, 1992
INVENTOR(S) : TETSURO FUKUI ET AL.  Page 1 of 8

It is certified that error appears in the above-identified patent and that said Letters Patent is hereby corrected as shown below:

COLUMN 2

Line 2, "20" should be deleted.

COLUMN 5

Line 2, Formula (I), "| |" with $R_1, R_2$ should read --| |-- with $r_1, r_2$.

Line 22, Formula (II), should be corrected as shown.

Line 38, Formula (III), should be corrected as shown.

UNITED STATES PATENT AND TRADEMARK OFFICE
CERTIFICATE OF CORRECTION

PATENT NO. : 5,100,766
DATED : March 31, 1992
INVENTOR(S) : TETSURO FUKUI ET AL.

It is certified that error appears in the above-identified patent and that said Letters Patent is hereby corrected as shown below:

COLUMN 6

Line 2, Formula (V),

"⊕" should read --  --.

Line 14, Formula (VI),

"⊕" should read --  --.

Line 24, Formula (VII),

"⊕" should read --  --.

COLUMN 7

Line 9, "⊕" should read --  --.

Line 58, Formula (4), "⊕" should read --  --.

UNITED STATES PATENT AND TRADEMARK OFFICE
CERTIFICATE OF CORRECTION

PATENT NO. : 5,100,766
DATED : March 31, 1992
INVENTOR(S) : TETSURO FUKUI ET AL.

It is certified that error appears in the above-identified patent and that said Letters Patent is hereby corrected as shown below:

COLUMN 8

Line 2, Formula (5), "⊕" should read -- (⊕) --.

Line 13, Formula (6),

"
$$\begin{array}{c} M \\ G\text{-}(CH=CH)_k N\text{-}R_9 \end{array}$$
" should read --
$$G\text{-}(CH=CH)_k \overset{\frown{-M-}}{N\text{-}R_9}$$
--.

Line 17, Formula (7),

"
$$\begin{array}{c} M \\ G\text{-}(CH\text{-}CH)_k \overset{\oplus}{N}\text{-}R_9 \end{array}$$
" should read --
$$G\text{-}(CH\text{-}CH)_k \overset{\frown{-M-}}{\overset{\oplus}{N}\text{-}R_9}$$
--.

Line 54, Formula (12),

"
$$\begin{array}{c} Z_2 \\ G\text{-}(C=C)_k L \\ |\ | \\ R_{13} R_{14} \end{array}$$
" should read --
$$\begin{array}{c} \frown{-Z_2-} \\ G\text{-}(C=C)_k L \\ |\ | \\ R_{13} R_{14} \end{array}$$
--.

COLUMN 10

Line 65, "hexyl" should be deleted.

COLUMN 17

Table 1-continued, No. 47,
"form" should read --form $-S-CH=C(CH_3)-$ --
and "$-S-CH=C(CH_3)-$" should be deleted.

UNITED STATES PATENT AND TRADEMARK OFFICE
CERTIFICATE OF CORRECTION

PATENT NO.   :   5,100,766
DATED        :   March 31, 1992
INVENTOR(S)  :   TETSURO FUKUI ET AL.

It is certified that error appears in the above-identified patent and that said Letters Patent is hereby corrected as shown below:

COLUMN 24

Line 26, Formula (II),

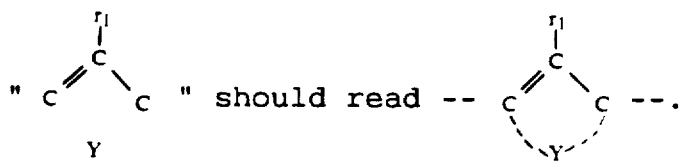

Line 33, Formula (III),

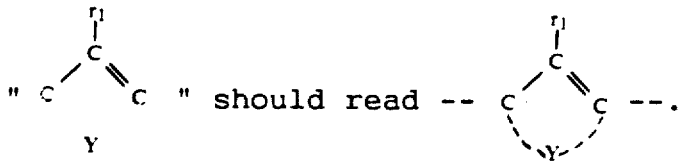

Line 51, "group $X^\ominus$" should read --group; $X^\ominus$--.

UNITED STATES PATENT AND TRADEMARK OFFICE
CERTIFICATE OF CORRECTION

PATENT NO. : 5,100,766
DATED : March 31, 1992
INVENTOR(S) : TETSURO FUKUI ET AL.

It is certified that error appears in the above-identified patent and that said Letters Patent is hereby corrected as shown below:

COLUMN 25

Line 2, Formula (V),

"⊕" should read --  --.

Line 37, Formula (VI),

"⊕" should read --  --.

Line 48, Formula (VII),

"⊕" should read --  --.

UNITED STATES PATENT AND TRADEMARK OFFICE
CERTIFICATE OF CORRECTION

PATENT NO. : 5,100,766

DATED : March 31, 1992

INVENTOR(S) : TETSURO FUKUI ET AL.      Page 6 of 8

It is certified that error appears in the above-identified patent and that said Letters Patent is hereby corrected as shown below:

COLUMN 26

Line 5, "and" should read --or--.
Line 8, Formula (VIII),
 "$(C-C)_z$" should read --$(C-C)_s$--.
Line 14, Formula (IX),
 "$(CH-CH)_z$" should read --$(CH-CH)_s$-- and

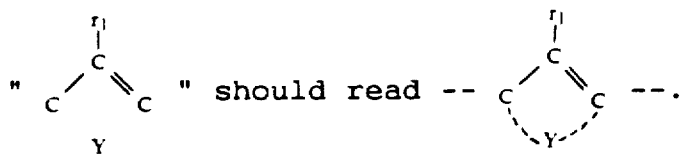

Line 21, Formula (X),
 "$(C-C)_z$" should read --$(C-C)_s$--.
Line 32, "sulfuratom," should read --sulfur atom,--.
Line 50, "$2^\ominus$" should read --$Z^\ominus$--.

COLUMN 27

Line 57, "$X\ominus$" should read --$X^\ominus$--.
Line 62, Formula (II),

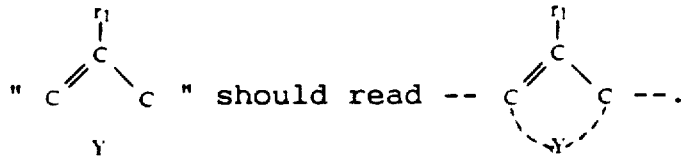

UNITED STATES PATENT AND TRADEMARK OFFICE
CERTIFICATE OF CORRECTION

PATENT NO. : 5,100,766

DATED : March 31, 1992

INVENTOR(S) : TETSURO FUKUI ET AL.

It is certified that error appears in the above-identified patent and that said Letters Patent is hereby corrected as shown below:

COLUMN 28

Line 3, Formula (III),

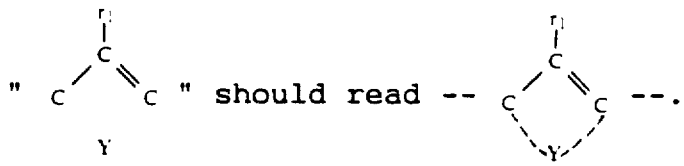

Line 23, "$X^{63}$" should read --$X^{\ominus}$--.

Line 46, Formula (V),

Line 58, Formula (VI),

COLUMN 29

Line 2, Formula (VII),

UNITED STATES PATENT AND TRADEMARK OFFICE
CERTIFICATE OF CORRECTION

PATENT NO. : 5,100,766
DATED : March 31, 1992
INVENTOR(S) : TETSURO FUKUI ET AL.

It is certified that error appears in the above-identified patent and that said Letters Patent is hereby corrected as shown below:

COLUMN 30

Line 4, Formula (VIII),
"$(C-C)_z$" should read --$(C-C)_s$--.

Line 8, Formula (IX),
"$(CH-CH)_z$" should read --$(CH-CH)_s$-- and

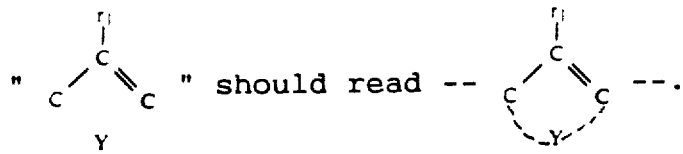

Line 15, Formula (X),
"$(C-C)_z$" should read --$(C-C)_s$--.
Line 28, "pyrrylium" should read --pyrylium--.
Line 29, "(which" should read --which--.
Line 31, "$R_{ls}$" should read --$R_{15}$--.
Line 44, "6 member;" should read --6 members;--.

Signed and Sealed this

Fifth Day of October, 1993

Attest:

BRUCE LEHMAN

*Attesting Officer*  *Commissioner of Patents and Trademarks*